2,812,323
DES-N-METHYL ERYTHROMYCIN

Edwin H. Flynn and Hubert W. Murphy, Indianapolis, Ind., assignors to Eli Lilly and Company, Indianapolis, Ind., a corporation of Indiana No Drawing. Application November 3, 1954, Serial No. 466,670

7 Claims. (Cl. 260—211)

This invention relates to a novel transformation product of an antibiotic and to a method for its preparation. More particularly, it relates to a transformation product of the antibiotic erythromycin, and to a method for obtaining said product.

By this invention we have provided a new compound, des-N-methyl erythromycin, a demethylation product of the antibiotic erythromycin in which one methyl group of the dimethylamino group in the erythromycin molecule has been removed.

Des-N-methyl erythromycin is prepared in two steps as follows: A dicarbobenzoxy derivative of erythromycin is formed by reacting benzyl chlorocarbonate with erythromycin. One of the carbobenzoxy groups appears to enter the molecule as a carbonate ester of a hydroxyl group and the other as a carbamate on the nitrogen of the amino group. During the formation of this carbamate group, one of the methyl groups of the dimethylamino radical is split off as methyl chloride. Thus, the carbobenzoxy derivative of the nitrogen is a true carbamate, and the new compound so produced is a benzyl carbonate benzyl carbamate of des-N-methyl-erythromycin. Des-N-methyl erythromycin is then prepared from this benzyl carbonate benzyl carbamate derivative by removing both the carbonate and carbamate groups.

Des-N-methyl erythromycin is a white crystalline solid which melts at about 144–146° C. The compound possesses an antibiotic activity similar in character to that of the parent substance, erythromycin, although its activity is less pronounced. Des-N-methyl erythromycin is also useful as a chemical intermediate in the preparation of new erythromycin-type compounds since the newly formed secondary amine group which it contains can be further reacted; as for example by alkylation or acylation. When des-N-methyl erythromycin is alkylated with a methyl group, erythromycin is, of course, obtained. Des-N-methyl-erythromycin is particularly useful in that it can be converted to a radioactive erythromycin by methylation with a radioactive C-methylating agent, such as $C_{14}$ radioactive formaldehyde and hydrogen. Erythromycin thus tagged with a radiocarbon atom in the dimethylamino group is useful not only in the commercial production of erythromycin as an analytical tool using isotope dilution techniques, but also in metabolic studies.

The reaction between erythromycin and benzyl chlorocarbonate to form des-N-methyl erythromycin benzyl carbonate benzyl carbamate, conveniently is carried out by employing an excess of benzyl chlorocarbonate, the benzyl chlorocarbonate serving both as a reactant and a solvent. A 50 to 200 percent weight excess of benzyl chlorocarbonate can be used and a 150 to 200 percent excess is preferably employed. The reaction between erythromycin and benzyl chlorocarbonate can also be carried out in the presence of an inert solvent, for example acetone, toluene, dioxan, and the like. When an inert solvent is employed, the amount of benzyl chlorocarbonate used can be greatly reduced from the amount specified above since it is here acting only as a reactant. However, even in this instance, a 25 to 50 percent weight excess of benzyl chlorocarbonate is generally employed, to insure complete reaction.

The reaction to form des-N-methyl erythromycin benzyl carbonate benzyl carbamate preferably is carried out in the presence of a base in the solid phase, said base being capable of reaction with hydrogen chloride. Sufficient solid base is used to neutralize fully the hydrogen chloride arising from a potential complete reaction of the benzyl chlorocarbonate present in the reaction mixture. Sodium bicarbonate is conveniently used as this solid base, although other solid bases such as potassium bicarbonate, sodium carbonate and the like can be employed with equal success. The reaction mixture should be efficiently stirred at all times in order to maintain intimate contact between the solid base phase and the liquid solution phase.

The reactions which result in the formation of des-N-methyl erythromycin benzyl carbonate benzyl carbamate are exothermic, and it is necessary, especially with large scale operations, to cool the reaction vessel during the course of these reactions in order to minimize by-product formation. Desirably the contents of the reaction vessel are maintained at about 50° C. during the course of the reaction to permit a short reaction period. The reaction can be carried out at a lower temperature but the time necessary for completion is somewhat lengthened thereby. Preferably the temperature is not permitted to go above 70° C. since temperatures higher than 70° C. are conducive to by-product formation.

The second step of the process by which des-N-methyl erythromycin is prepared involves the cleavage of both the benzyl carbonyl radicals from des-N-methyl erythromycin benzyl carbonate benzyl carbamate. This cleavage can readily be accomplished by a hydrogenolysis procedure using hydrogen gas and a hydrogenation catalyst. Preferably, palladium black in an alcoholic solvent is employed as the hydrogenation catalyst, and hydrogen gas is bubbled into a solution containing both catalyst and des-N-methyl erythromycin benzyl carbonate benzyl carbamate at ordinary pressures until the hydrogenolysis is complete. Customarily, water and acetic acid-sodium acetate buffer are added to the alcoholic solvent as a precaution since the amount of acid which can be produced in the course of hydrogenolysis can reduce the pH of the solution to below pH 4, in which acidic region decomposition of des-N-methyl erythromycin would take place. Other buffer mixtures are operative provided they are capable of preventing a strong shift of pH to the acid side during the hydrogenation. Other hydrogenation catalysts can also be employed, as for example, platinum black, palladium on barium carbonate, and the like. In addition to aqueous ethanol, other solvents commonly used for hydrogenations can be employed, such including methyl cyclohexane, propanol, aqueous acetic acid, n-hexane, and the like.

In the foregoing, our invention has been illustrated by the use of the reagent benzyl chlorocarbonate and its reaction products with erythromycin and des-N-methyl erythromycin. It is to be understood, however, that in addition to benzyl chlorocarbonate, chlorocarbonates of other weakly electronegative radicals can be used, as for example, allyl chlorocarbonate, p-methoxy benzyl chlorocarbonate, ortho methyl benzyl chlorocarbonate, and for the purposes of this invention, such are the equivalent of benzyl chlorocarbonate.

The following examples further illustrate both the new products provided by this invention and methods for their preparation.

EXAMPLE 1

*Preparation of des-N-methyl erythromycin benzyl carbonate benzyl carbamate*

50 g. of pure erythromycin were added portionwise to a stirred mixture of 25 g. of sodium bicarbonate in 75 ml. of benzyl chlorocarbonate over a period of 45 minutes. The temperature was maintained below 55° C. during this period by external cooling. Stirring of the reaction mixture was continued for one hour after completion of the addition of erythromycin. Next, benzene was added to bring the volume to about 500 ml. The reaction mixture was filtered to remove solid inorganic salts and the filtrate was then extracted with three 150 ml. portions of 0.25 N HCl followed by 100 ml. of water. The benzene solution comprising des-N-methyl erythromycin benzyl carbonate benzyl carbamate and benzyl chlorocarbonate was dried over anhydrous magnesium sulfate. The drying agent was filtered off, and the filtrate was evaporated to dryness in vacuo. 25 ml. of chloroform and 50 ml. of diethyl ether were then added in order to dissolve the resulting residue. Hexane was added to this solution to the point of turbidity, about 250 ml. being necessary. Upon chilling this mixture, crystals of des-N-methyl erythromycin benzyl carbonate benzyl carbamate precipitated. The crystals were filtered off and dried. Recrystallization was carried out by dissolving the crystalline material in a mixture of 25 ml. of chloroform and 25 ml. of diethyl ether and then adding hexane to the point of incipient precipitation—about 150 ml. of hexane being required. 18 g. of crystalline des-N-methyl erythromycin benzyl carbonate benzyl carbamate were obtained after this recrystallization and these crystals, after drying, melted at about 160–165° C.

The 18 g. of crystalline material obtained above were redissolved in 500 ml. of benzene and again extracted with 0.25 N HCl, three portions of 75 ml. each being used. A wash of 100 ml. of water followed, at the completion of which the organic layer was separated, dried and then evaporated to dryness in vacuo. The resulting residue was crystallized from 25 ml. of chloroform, 25 ml. of diethyl ether and 150 ml. of hexane. Upon chilling, crystals of des-N-methyl erythromycin benzyl carbonate benzyl carbamate precipitated. These crystals were collected by filtration and after drying they melted at 192–193° C.; weight =11 g.

EXAMPLE 2

*Preparation of des-N-methyl erythromycin*

15 g. of des-N-methyl erythrmoycin benzyl carbonate benzyl carbamate were dissolved in a mixture consisting of 300 ml. of ethanol, 45 ml. of water, 1.5 g. of sodium acetate, 0.9 ml. of glacial acetic acid, and 0.6 g. of palladium black. Hydrogen gas was bubbled through this solution for 7 hours. The catalyst was removed by filtration and the solution was concentrated in vacuo to near dryness. The residue which at this point comprised des-N-methyl erythromycin, was redissolved in 240 ml. of water and was then cooled to 5° C. The solution was adjusted to about pH 10 with 1 N. sodium hydroxide. Upon standing at room temperature, the solution deposited crystals of des-N-methyl erythromycin. The solution was allowed to stand two days during which time both further crystalline material and amorphous material deposited. All precipitated material was filtered and recrystallized from water. The resulting des-N-methyl erythromycin was separated by filtration and dried. Crystals of this material melted at about 139–145° C. They weighed 10.45 g., representing a yield of 96 percent of theory. An alternate method for the purification of des-N-methyl erythromycin is as follows: 11.6 g. of crystalline des-N-methyl erythromycin obtained from water were suspended in 60 ml. of acetone and the mixture brought to a boil. On standing at room temperature, 8 g. of crystalline des-N-methyl erythromycin separated, which after drying melted at about 141–142° C. Repeated recrystallization in this manner gave a material which melted at about 146–150° C.

*Analysis.*—Calc'd. for $C_{36}H_{65}NO_{13}$: C=60.06; H=9.10. Found: C=60.46; H=9.27.

EXAMPLE 3

*Preparation of des-N-methyl erythromycin benzyl carbonate benzyl carbamate*

30. g. of erythromycin were dissolved in 260 ml. of dry dioxan containing 15 g. of sodium bicarbonate. 26 ml. of toluene were added to this mixture. 37.5 g. of benzyl chlorocarbonate were added over a period of 3 hours to the above mixture which was maintained below 50° C. during the period of addition by vigorous stirring and external cooling. The solid inorganic salts were then filtered off, and the filtrate was evaporated to dryness in vacuo. The resulting solid was dissolved in 180 ml. of acetone. 900 ml. of cyclohexane were added to this solution, thus causing an initial slight precipitation of des-N-methyl erythromycin benzyl carbonate benzyl carbamate. Chilling of the solution caused further precipitation of crystalline des-N-methyl erythromycin benzyl carbonate benzyl carbamate. Purification of the des-N-methyl erythromycin benzyl carbonate benzyl carbamate thus obtained was carried out as follows: The crystals were dissolved in a mixture of methanol, water and sodium bicarbonate and heated for 4 hours on the steam bath. The solvents were then removed in vacuo and the residue was extracted with chloroform. The chloroform extract was in turn extracted 6 times with a phosphate buffer having a pH value of 6. The chloroform layer was washed with water, and was separated and dried. It was then evaporated to dryness in vacuo. The residue was recrystallized from a mixture of acetone and cyclohexane, yielding des-N-methyl erythromycin benzyl carbonate benzyl carbamate which melted at about 191–192° C.

We claim:

1. The process of preparing des-N-methyl erythromycin which comprises reacting erythromycin with at least two molar equivalents of benzyl chlorocarbonate in the presence of a solid base at a temperature under about 70° C. to form des-N-methyl erythromycin benzyl carbonate benzyl carbamate and then removing the benzyl carbonyl groups by hydrogenation in the presence of a noble metal hydrogenation catalyst to produce des-N-methyl erythromycin.

2. The process of claim 1 in which the noble metal hydrogenation catalyst is palladium black.

3. The process which comprises reacting erythromycin with at least two molar equivalents of benzyl chlorocarbonate in the presence of a solid base at a temperature below about 70° C. to produce des-N-methyl erythromycin benzyl carbonate benzyl carbamate.

4. The process according to claim 3 in which the reaction is carried out in the presence of about two molar equivalents of a solid base capable of neutralizing hydrogen chloride.

5. The process according to claim 4 in which the solid base is sodium bicarbonate.

6. The process which comprises subjecting des-N-methyl erythromycin benzyl carbonate benzyl carbamate to hydrogenolysis in inert solvent solution in the presence of a noble metal hydrogenation catalyst thus forming des-N-methyl erythromycin.

7. Des-N-methyl erythromycin benzyl carbonate benzyl carbamate.

References Cited in the file of this patent

FOREIGN PATENTS 506,308   Canada _____ Oct. 5, 1954

OTHER REFERENCES

Karrer: "Organic Chemistry," 1950, page 297.
Murphy: "Antibiotics Annual, 1953–4," pages 500–513 (October 1953).
Lee et al.: "Antibiotics Annual, 1953–4," pages 493–5 (October 1953).
Flynn et al.: J. Am. Chem. Soc., 76, 3123, 3126 (1954).
Wells et al.: 2nd Ann. Sym. on Antibiotics, October 1954, Paper No. 43.
Flynn et al.: J. Am. Chem. Soc., 77, 3104–6 (1955).
Sylvester et al.: 2nd Ann. Sym. on Antibiotics, October 1954, Paper No. 41.